March 29, 1938.   M. R. HULL   2,112,698
BIN GATE
Filed May 2, 1935   3 Sheets-Sheet 1
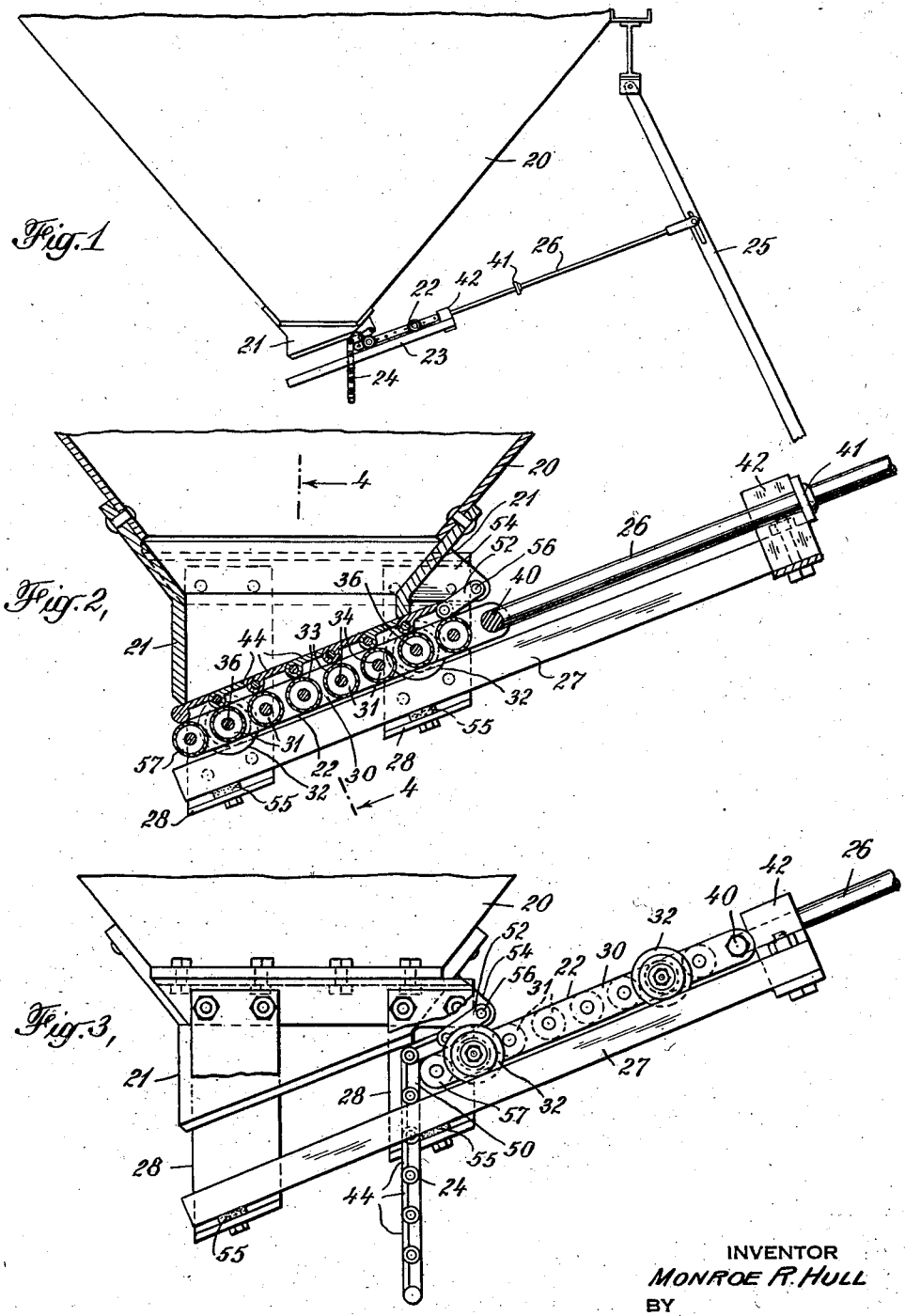
INVENTOR
MONROE R. HULL
BY
Pennie, Davis, Marvin & Edmonds
ATTORNEYS

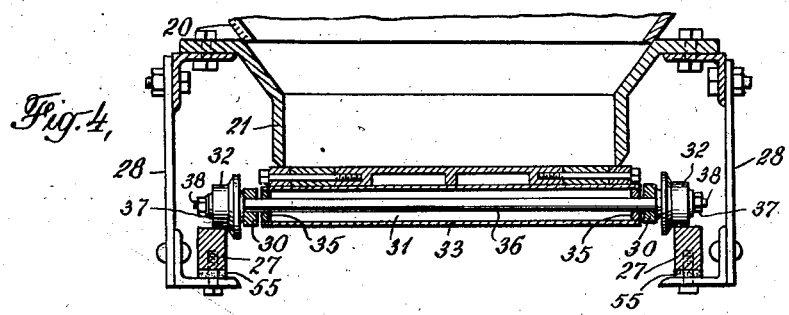
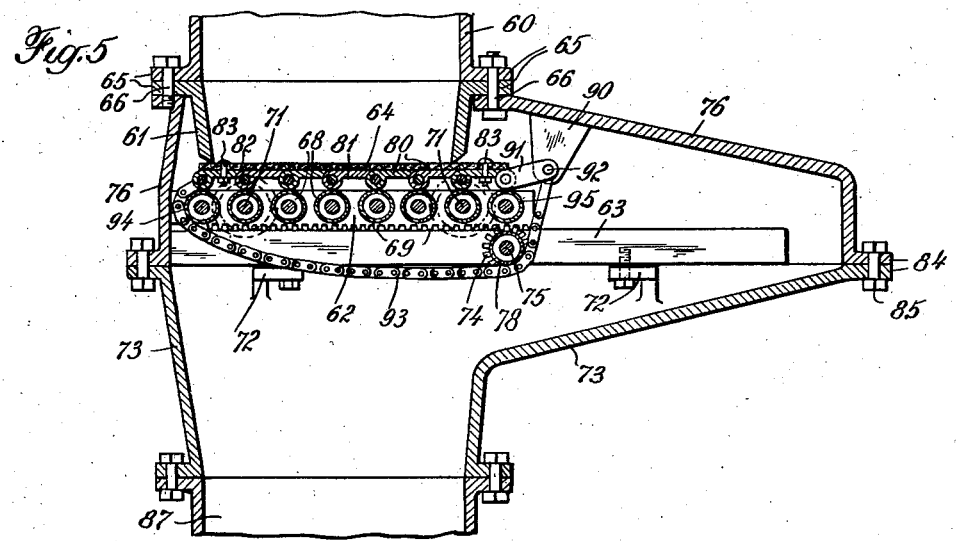
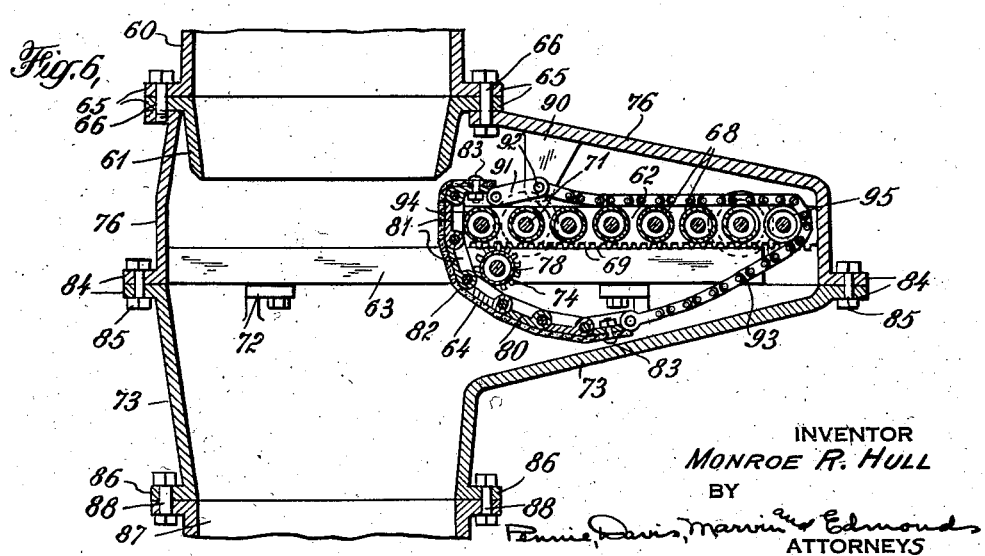

March 29, 1938.　　　M. R. HULL　　　2,112,698
BIN GATE
Filed May 2, 1935　　　3 Sheets-Sheet 3
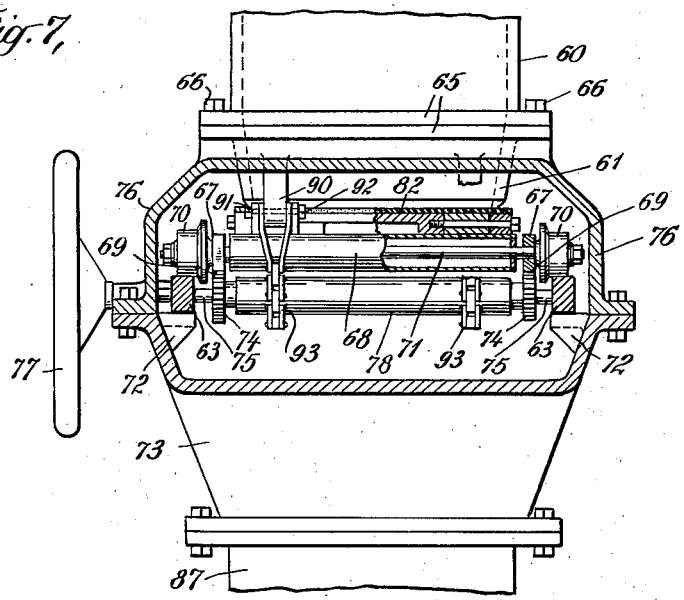
INVENTOR
MONROE R. HULL
BY
Pennie, Davis, Marvin & Edmonds
ATTORNEYS Patented Mar. 29, 1938

2,112,698

UNITED STATES PATENT OFFICE 2,112,698

BIN GATE

Monroe R. Hull, Anaconda, Mont.

Application May 2, 1935, Serial No. 19,336

6 Claims. (Cl. 221—145)

This invention relates to gates for use in closing conduits to the passage of materials therethrough. The invention relates particularly to gates for closing the discharge conduits or nozzles of bins or other receptacles containing solid, liquid, or semi-liquid materials and has for an object the provision of an improved gate of rugged construction and of such nature that it may be easily and economically operated.

Many types of gates proposed and employed for closing the discharge conduits of bins and other receptacles heretofore have been open to various objections. For example, gates have been constructed in the form of doors adapted to slide in guides across the opening which they are intended to close. Such gates are difficult to open and close, are liable to jam, and require considerable power for their operation. Other gates have been constructed with flexible closure members arranged to be moved across the openings to be closed in such manner that the liability of the gate to jam is greatly reduced, but such gates have not been satisfactory for use in conjunction with finely pulverulent or liquid substances, or they have been of relatively delicate construction, or they have been objectionable for other reasons.

The present invention provides a gate of improved construction which is not subject to disadvantages inherent in many of the types of gates employed heretofore, and which in addition is well suited for use in handling lump, pulverulent, or liquid materials.

The gate of the invention comprises an articulated closure member adapted to close a conduit to the passage of material therethrough and a closure operating mechanism for moving the closure member into closed engagement with the open end of a conduit and for holding the closure member in the closed position. The closure operating mechanism comprises a reciprocable carriage having suitable means, such as rollers, associated therewith for establishing contact with the closure member and for transmitting force applied to the carriage to the closure member to move the closure member against the pressure of material discharging from the conduit into position to close the conduit and to hold the closure member in the closed position. In a preferred embodiment of the invention, the closure member is disposed between the open end of the conduit and the reciprocable carriage, and, if desired, a flexible, impervious covering may be associated with the closure member so that substantially liquid-tight closure of the conduit may be effected.

The reciprocable carriage travels upon a runway which is arranged to support the carriage and any force exerted upon it. Means for reciprocally moving the carriage are provided advantageously in conjunction with means for limiting the travel thereof. If desired, the entire apparatus may be enclosed in a suitable housing.

The invention will be better understood from a consideration of the following description in conjunction with the accompanying drawings, in which Fig. 1 is a side elevation of an installation of a gate constructed in accordance with the invention;

Fig. 2 is a cross-section through a gate of the general type shown in Fig. 1, showing the gate in the closed position;

Fig. 3 is an elevation of the gate shown in Fig. 2, showing the gate in the open position;

Fig. 4 is a cross-section through elements of a gate of the type shown in Figs. 1 to 3;

Fig. 5 is a cross-section through a modified form of gate, showing the gate in the closed position;

Fig. 6 is a cross-section through the gate shown in Fig. 5, showing the gate in the open position;

Fig. 7 is an end view, partly in section, of the gate shown in Figs. 5 and 6;

Fig. 8 is a plan view of an articulated closure member for use in the gates shown in Figs. 1 to 7;

Fig. 9 is a section taken substantially along the line 9—9 of Fig. 8; and

Fig. 10 is a perspective view of one flight of the closure member shown in Fig. 8.

In the apparatus shown in Figs. 1 to 4, a receptacle 20 provided at the bottom with a discharge conduit 21 is equipped with a gate constructed in accordance with the invention. The gate (Fig. 1) comprises a receprocable carriage 22 mounted on a runway 23 below the open end of the discharge conduit 21, an articulated closure member 24 disposed between the reciprocable carriage 22 and the open end of the conduit 21, and means comprising a lever 25 and a connecting rod 26 for imparting reciprocable motion to the carriage 22. The carriage 22 is adapted to be moved across the open end of the conduit 21, and, when so moved, it moves the closure member 24 into closed engagement with the conduit 21 against the pressure of material discharging therefrom. Means associated with the carriage 22 provide for holding the closure member 24 in the closed position.

The receptacle 20 may be of any suitable size and construction for holding solid, liquid, or semiliquid materials. It is shown in the drawings in the form of a conical hopper, but it may be of any suitable form or configuration. The discharge conduit 21 associated with the receptacle 20 at the bottom thereof likewise may be of any suitable size and configuration, dependent only upon the rate at which it is desired to discharge material from the receptacle and the direction in which it is desired to cause the discharging material to flow. In the drawings, the conduit 21 is shown as providing for the discharge of material vertically downwardly, but it will be understood that the conduit may equally well be of such shape as to provide for the discharge of material in a horizontal direction, or at any angle between the horizontal and the vertical.

The reciprocable carriage 22 is supported upon a runway 23 below the open end of the conduit 21 and is adapted to be moved thereacross in spaced relationship therewith. The runway 23 comprises a pair of rails 27 supported upon brackets 28 in such a manner that the motion of the carriage 22 along the runway 23 will be in a direction substantially parallel to the plane of the open end of the conduit 21. The brackets 28 for supporting the rails 27 of the runway may be mounted upon any suitable supporting structure, but they are advantageously connected directly to the conduit 21, for, in this manner, the relative positions of the runway 23 and the open end of the conduit 21 may be most easily adjusted and maintained.

The reciprocable carriage 22 comprises two spacing bars 30 which serve as frame members, a plurality of rollers 31 disposed between the spacing bars 30 and having their end portions journaled therein, and two or more pairs of flanged wheels 32 upon which the carriage is supported for travel along the runway 23.

The rollers 31 preferably are constructed of a tubular outer member 33, the length of which corresponds substantially to the distance between the inner surfaces of the spacing bars, and an inner axle member 34, the length of which corresponds to the distance between the outer surfaces of the spacing bars. Annular rings 35 which fit over the axle member 34 of the roller and engage with the end portions of the outer tubular member 38 may be welded or otherwise connected to both the axle member and the tubular member to center the tubular member about the axle member and to hold the two members in their correct positions relatively to one another. As indicated above, the end portions of the axle members 34 of the rollers project beyond the ends of the tubular members 33 of the rollers by a distance corresponding to the thickness of the spacing bars 30, and these projecting end portions of the rollers are journaled for free rotation in bearing holes suitably drilled in the spacing bars.

The axle members 36 of two of the rollers 31 adjacent opposite ends of the carriage are sufficiently long so that when they have been journaled in their respective bearing holes in the spacing bars 30, they will project a substantial distance beyond the outer surfaces of the spacing bars. The flanged wheels 32 which support the carriage upon the rails 27 of the runway 23 are mounted for free rotation upon the projecting end portions of the axle members 36 adjacent the outer surfaces of the spacing bars 30 and are held in position by means of nuts 37 engaging threads provided adjacent the extreme outer end portions 38 of the axle members. The flanged wheels 32, in addition to serving as supporting means for the carriage 22 upon the runway 23, serve also to hold the spacing bars in position and to prevent them from spreading apart to such an extent that the axle members 34 of the rollers might be released from their bearings in the spacing bars. It will be understood, however, that cross bars (not shown) may, if desired, be employed to hold the spacing bars in correct position relatively to one another and to the rollers, but if such cross bars are employed, they must be so positioned as not to interfere with the operation of the gate when the closure member is moved into or released from its closed position.

Reciprocating movement may be imparted to the carriage 22 by means of a connecting rod 26 engaging with a lever 25 or other suitable mechanism. The connecting rod 26 is connected to the carriage 22, preferably to the spacing bars 30 thereof, in any appropriate manner, for example by means of a cross bar 40. Means, preferably associated with the connecting rod 26 and with the runway 23, are provided for limiting the distance of travel of the carriage, and may comprise a collar 41 connected to the connecting rod 26 and a stop 42 mounted upon the runway 23 adjacent the rearward end thereof. The carriage 22 may be moved forward only to the point at which the collar 41 meets with and engages the stop 42 (Fig. 2), and withdrawal of the carriage from the forward position may continue only until the cross bar 40 meets with and engages the stop 42 (Fig. 3).

The articulated closure member 24 which serves, when in closed position, to close the conduit 21 to the passage of material therethrough, comprises a plurality of flights 44 flexibly joined together (Figs. 8 to 10). Each flight 44 is long in comparison with its width, its length being sufficient to span the open end of the conduit 21. Each flight 44 is provided adjacent either end portion with a male portion 45 and a corresponding female portion 46 of a hinge, and both portions of the hinge are drilled to receive a hinge pin 47. In assembling the closure member, the male portions 45 of one flight 44 are placed in engagement with the female portions 46 of the adjoining flight, and the hinge pins 47 are then installed. Advantageously, the end portions of the hinge pins 47 are threaded to engage with corresponding threads 48 provided adjacent the inner portions of the female portions 46 of the hinge; such construction reduces to a minimum the likelihood that adjoining flights of the closure member may disengage from one another after assembly thereof.

The underside of each flight 44 of the closure member is provided with ridges 50 extending from the edges of the female portions 46 to the corresponding edges of the male portions 45 of the hinges. The ridges 50 project downwardly a distance substantially equal to the distance by which the male and female portions of the hinge extend below the under surface of the flight 44, and provide surfaces against which the rollers 31 of the carriage 22 may operate, as will be described more fully hereinafter. If desired, and advantageously, if the width of the discharge conduit and hence the length of the flights is relatively great, the underside of each flight may be provided with additional ridges (not shown) substantially adjacent the mid-portion of the flight.

The forward flight 51 of the closure member may be constructed, as shown in the drawings, with the female portion of the hinge omitted, but if economy so dictates, it may be configured exactly the same as the other flights 44. In such case, however, it may be necessary to insure that the recess of the female portion of the hinge does not allow the escape of material from the conduit when the closure member is in the closed position.

Connecting links 52 are fastened to the male portion of the hinge of the rearward flight 53 of the closure member, and serve for pivotally connecting the closure member to retaining members 54.

In assembling the gate, the rails 27 of the runway 23 are suitably mounted on the brackets 28, and shims 55 may be employed in order properly to adjust the position of the rails 27 with respect to the open end of the conduit 21. The closure member 24 is mounted in position by connecting the rearward flight thereof to the retaining members 54 by means of the links 52 and pivot pins 56. The retaining members 54 are advantageously connected rigidly to the side walls of the discharge conduit 21, but they may, of course, be connected to any suitable supporting structure.

The carriage 22 is mounted upon the runway 23 in such a manner that the closure member 24 is positioned between the carriage and the open end of the conduit 21. The connecting rod 26 and the lever 25 or other motivating means are mounted in operative positions, and the gate is ready for use.

The operation of the gate is as follows: Starting with the gate in open position with the major portion of the closure member hanging substantially vertically (Figs. 1 and 3), the lever 25 or other motivating means is set in operation to move the carriage 22 forward along the runway 23. The leading roller 57 establishes contact with the ridges 50 on the underside of one of the flights 44 of the closure member 24, and as the carriage is advanced, the force applied to the carriage is transmitted by the leading roller 57 to the flight to move it upwardly against the pressure of material discharging from the conduit into closed position against the open end of the conduit 21. When one flight of the closure member has thus been moved into the closed position, the leading roller 57 establishes contact with the ridges of the next flight of the closure member, and with continued advance of the carriage it is forced into the closed position. Thus, as the carriage advances, each flight of the closure member is successively moved into the closed position against the open end of the discharge conduit 21, until the last flight of the closure member is so moved, thereby effecting complete closure of the conduit (Fig. 2), and at this point engagement of the collar 41 with the stop 42 prevents further forward motion of the carriage.

Once a flight of the closure member 24 has been moved into the closed position, it is held in such position by successive rollers 31 of the advancing carriage, which bear against the ridges upon the underside of the flight. When the entire closure member has been moved into the closed position and forward motion of the carriage has ceased, the weight of the closure member and any force applied thereto by the pressure of material in the conduit is supported by the rollers of the carriage.

To open the gate the procedure is reversed. As the carriage 22 is withdrawn from its position across the open end of the conduit 21, the flights of the closure member drop, one by one, into an open position, until the carriage has been drawn back as far as it will go, in which position the open end of the conduit 21 is unobstructed and free discharge of material therefrom is permitted. It will, of course, be obvious that the gate may be only partially closed by advancing the carriage 22 only a part of the distance across the open end of the conduit 21.

The gate described above is particularly well suited for use in conjunction with bins or other receptacles containing solid material, such, for example, as minerals in lump or granular form. A modified form of gate made in accordance with the invention and which is particularly well suited for handling liquid or semi-liquid materials is described below in conjunction with Figs. 5 to 7.

In general, the modified gate shown in Figs. 5 to 7 is of the same construction as the gate shown in Figs. 1 to 4, and it functions in substantially the same manner. The modified gate comprises a conduit 60 associated with a suitable receptacle (not shown) adapted to contain liquid or semi-liquid material and having a nozzle 61 connected thereto. A reciprocable carriage 62 supported on rails 63 is positioned below the discharge end of the nozzle 61 in spaced relationship therewith. A closure member 64 is mounted between the reciprocable carriage 63 and the discharge end of the nozzle 61, and is adapted to be moved into a closed position across the discharge end of the nozzle 61 when the reciprocable carriage 62 is moved thereacross. Suitable means are provided for imparting reciprocable movement to the carriage 62.

The nozzle 61 may be of any suitable size and configuration, and may be connected to the conduit 60 in any appropriate manner, for example by means of flanges 65 and bolts 66 as shown in the drawings. The discharge end of the nozzle is suitably configured for engagement with the closure member 64 when the closure member is in the closed position.

The reciprocable carriage 62 is constructed in substantially the same manner as the carriage 22 described above in conjunction with Figs. 1 to 4, and comprises a pair of spacing bars 67, a plurality of rollers 68 journaled for free rotation in suitable bearings in the spacing bars, and two or more pairs of flanged wheels 70 upon which the carriage is supported on the rails 63. As in the carriage 22 described above, the flanged wheels are mounted for free rotation upon projecting end portions of the axle members 71 of two or more of the rollers 68. The rails 63 upon which the carriage 62 travels are mounted upon brackets 72 which in turn are supported by a housing member 73, to be more fully described below.

Rack and pinion means are employed for imparting reciprocating motion to the carriage 62. To this end, the under surface of the spacing bars 67 are provided with rack teeth 69 with which the teeth of pinions 74 engage. The pinions 74 are mounted upon a shaft 75, and the shaft with pinions mounted thereon is journaled in suitable bearings preferably in the rails 63. One end portion of the shaft 75 extends outwardly through the wall of a housing member 76 (to be more fully described hereinafter), and a hand-wheel 77 or other appropriate means for applying a turning moment to the shaft 75 is mounted upon the outwardly projecting end portion thereof. The shaft 75 is advantageously provided with an idler roller 78.

The general construction of the articulated closure member 64 is substantially identical with that of the closure member 24 described above in conjunction with Figs. 1 to 4 and shown in detail in Figs. 8 to 10; it comprises a plurality of flights 80 suitably hinged together and having ridges 81 provided adjacent the underside of each flight. For the purpose of providing substantially liquid-tight engagement of the closure member 64 with the discharge end of the nozzle 61 when the closure member is in the closed position, a flexible, impervious covering 82 may be applied to the upper surface of the articulated closure member and may be held in position by means of bolts 83. The particular material of which the covering 82 is composed will depend upon the conditions to which it is subjected in operation, but, in general, for handling relatively cool pulverulent substances or water solutions or suspension, a piece of rubber belting or similar material may be employed. Other materials known to the art may, of course, be used in the event that the substances to be handled would have a deleterious effect upon rubber.

The various members of the modified gate are enclosed in a housing comprising an upper housing member 76 and a lower housing member 73. The upper housing member 76 is bolted to the conduit 60 and to the nozzle 61 associated therewith by means of the bolts 66. The upper and lower housing members 76 and 73 are provided with corresponding flanges 84 and are bolted together by means of bolts 85. The lower end of the lower housing member 73 may be provided with a flange 86 to which a correspondingly flanged discharge conduit 87 may be connected by means of bolts 88. The housing members completely enclose the nozzle 61, the closure member 64, and the carriage 62, and thus provide an enclosed valve from which there is little danger that liquid or semi-liquid materials will escape.

The inside length of the housing member 76 is advantageously substantially equal to the length of the spacing bars 67 plus the distance of travel of the carriage 62 and serves to prevent over-travel of the carriage when the gate is fully open or fully closed.

The modified gate is assembled as follows: The nozzle 61 and the upper housing member 76 are bolted in position adjacent the lower end of the conduit 60. The upper housing member 76 has associated with it a retaining member 90, and to this retaining member the closure member 64 is pivotally connected by means of links 91 and pivot pins 92. This assembly, except for the relative position of the retaining member 90, is substantially identical with the corresponding assembly of the gate described above in conjunction with Figs. 1 to 4.

The modified gate is assembled with flexible means to provide for the retraction of that part of the closure member 64 and its covering 82 which would otherwise hang substantially vertically downwardly with the closure member in the open position. These flexible means comprise chains 93 pivotally connected to the forward end portion of the closure member 64 and to the retaining member 90, the chains 93 being installed so as to pass beneath the closure member 64, under the carriage 62, and around the idler pulley 78 on the shaft 75.

The carriage 62 is mounted for reciprocating motion on the rails 63, which in turn are supported on brackets 72 associated with the lower housing member 73. This position of the carriage 62 is such that the closure member 64 together with its covering 82 is disposed between it and the discharge end of the nozzle 61. The spaced relation of the rails 63 and the end of nozzle 61 is such that the covering 82 will be pressed against the end of the nozzle 61 to make a substantially liquid-tight joint. To insure proper spacing, shims (not shown) may be employed between the rails 63 and the brackets 72.

With the closure member in the closed position (Fig. 5), the chains 93 which are pivotally connected to the forward end of the closure member 64, pass around the leading roller 94 of the carriage, under the carriage, around the idler roller 78, behind the rearward roller 95 of the carriage, and are pivotally connected to the retaining member 90, to which the closure member 64 is also pivotally connected, by means of the pivot pins 92.

The shaft 75 carrying the pinions 74 is mounted in position with the pinions engaging the rack teeth 69 on the underside of the spacing bars 67 of the carriage. The handwheel 77 is mounted upon the projecting end portion of the shaft 75, and the conduit 87 is connected to the lower housing member 73.

The operation of the modified gate is substantially the same as that of the gate described above in conjunction with Figs. 1 to 4. Starting with the gate in the open position (Fig. 6), the handwheel 77 is turned in the proper direction to cause the carriage 62 to move across the discharge end of nozzle 61. The leading roller 94 of the carriage establishes contact with the ridges 81 of one of the flights 80 of the closure member 64, and as the carriage advances, the flight is moved upwardly into closed engagement with the discharge end of the nozzle. The leading roller of the carriage then establishes contact with the ridges 81 of the next successive flight 80 of the closure member, and forces it against the pressure of material discharging from the nozzle into the closed position against the discharge end thereof. As the carriage advances, the chains 93, which have been holding the forward end of the closure member in retracted position, pass over the rearward roller 95 of the carriage to allow the retracted flights of the closure member to be moved into the closed position. Continued advance of the carriage results in the movement of successive flights of the closure member 64 into closed engagement with the discharge end of the nozzle 61, the flexible covering 82 being forced against the discharge end of nozzle 61, until the nozzle is completely closed to the passage of material therethrough (Fig. 5).

The nozzle is opened for the discharge of material by reversing the above-described operations. The handwheel 77 is turned in the proper direction to effect withdrawal of the carriage from its position across the discharge end of the nozzle 61, and as it is withdrawn successive flights of the closure member are released from the closed position. As the carriage retreats, the chains 93 pass around the idler roller 78 and upwardly over the rearward roller 95 of the carriage, and as this occurs, the released flights of the closure member, together with the flexible covering 82, are retracted by the chains from the path of flow of material discharging from the nozzle. Withdrawal of the carriage from its position across the discharge end of the nozzle 61 is continued until the nozzle is opened to the free discharge of material. Obviously, the degree of closure of the nozzle to the discharge of material may be varied by adjusting the position of the carriage with respect to the discharge end of the nozzle.

Various modifications in the above-described apparatus may be made without departing from the spirit of the invention. For example, the gate may be designed to effect the closure of a horizontal conduit, the plane of the open end of which is substantially vertical, by employing chains or other means for the retraction of the closure member from engagement with the end of the conduit. Housings enclosed in the mechanism of the gate may be employed or omitted as desired. Motivating means other than the particular means described for imparting reciprocable motion to the carriage are available to those skilled in the art, and modifications in the design and construction of the gate as specifically described may readily be made.

Gates according to the invention are easily adapted for use in the handling of finely pulverulent, liquid, or semi-liquid materials, such, for example, as roaster calcines or metallurgical or chemical pulps or suspensions. In the handling of pulverulent materials, either of the modifications specifically described above may be employed, but in general the modification described in conjunction with Figs. 1 to 4 will be the more suitable. For handling liquid or semi-liquid materials, the modified gate shown in Figs. 5 to 7 will generally be preferred.

Gates constructed in accordance with the invention are extremely well suited for use in effecting the closure of bins containing material in the form of coarse lumps. Owing to the manner in which the gate operates, successive flights of the closure member being moved against the flow of discharging material rather than across the flow thereof as heretofore has been customary, the likelihood that the gate will be jammed by a lump of the discharging material is reduced to a minimum, and at the same time the ease with which the gate is operated is greatly increased. As a result, gates according to the invention are more easily and economically operated than gates of the type that heretofore have been employed or proposed.

I claim:—

1. Apparatus of the class described comprising a receptacle, a conduit through which material may be discharged from the receptacle; and a gate for closing the conduit comprising an articulated closure member having ridges disposed adjacent the underside thereof to provide bearing surfaces and a reciprocable carriage having means associated therewith for establishing contact with the bearing surfaces provided adjacent the underside of the closure member, said carriage being adapted to move the closure member against the pressure of material discharging from the conduit into position to close the conduit and to hold the closure member in the closed position.

2. In a gate for closing a conduit to the passage of material therethrough, an articulated closure member having ridges disposed adjacent the underside thereof to provide bearing surfaces, and a reciprocable carriage having roller means associated therewith for establishing contact with the bearing surfaces provided adjacent the underside of the closure member, said carriage being adapted to move the closure member against the pressure of material discharging therethrough and to hold the closure member in the closed position.

3. Apparatus adapted to close the mouth of a conduit to the passage of finely divided material comprising a reciprocable carriage adapted to be moved across the mouth of the conduit in spaced relationship therewith, a closure member disposed between the mouth of the conduit and the carriage and comprising a plurality of metal flights having metal hinge portions formed thereon, said flights being connected by means of said hinge portions to form an articulated closure member, means for moving the carriage across the mouth of the conduit to move the closure member against the pressure of material discharging from the conduit into closed engagement therewith, ridges formed on the undersurface of each flight of the closure member between the hinge portions to provide a continuous bearing surface on the underside of the closure member, and rollers mounted on the carriage and adapted to bear against the bearing surface provided by the ridges and the hinges and to hold the closure member in the closed position.

4. Apparatus adapted to close the mouth of a conduit to the passage of finely divided material comprising a reciprocable carriage adapted to be moved across the mouth of the conduit in spaced relationship therewith, a closure member disposed between the mouth of the conduit and the carriage and comprising a plurality of metal flights having metal hinge portions formed thereon, said flights being connected by means of said hinge portions to form an articulated closure member, means for moving the carriage across the mouth of the conduit to move the closure member against the pressure of material discharging from the conduit into closed engagement therewith, ridges formed on the undersurface of each flight of the closure member between the hinge portions to provide a continuous bearing surface on the underside of the closure member, and rollers mounted on the carriage and adapted to bear against the bearing surface provided by the ridges and the hinges and to hold the closure member in the closed position, said rollers being spaced apart a distance substantially equal to the width of the flights of the closure member so that each flight of the closure member in a closed position is supported by at least one roller.

5. Apparatus adapted to close the mouth of a conduit comprising a reciprocable carriage adapted to be moved across the mouth of the conduit, a closure member, comprising a plurality of flights having hinge portions thereon and connected by means of said hinge portions to form an articulated closure member, disposed between the carriage and the mouth of the conduit, and means securing one end of the articulated closure adjacent a side of the mouth of the conduit, a forward portion of said closure member, when in an opened position, hanging downwardly substantially freely over the forward end of the carriage in such manner that as the carriage is advanced across the mouth of the conduit, each flight of the closure member in turn is moved by the carriage forwardly and upwardly about a pivot defined by the axis of the hinge by means of which the flight thus moved is connected to the next flight to the rear, thereby to move each flight in turn into closed engagement with the mouth of the conduit.

6. Apparatus adapted to close the mouth of a conduit comprising a reciprocable carriage adapted to be moved across the mouth of the conduit, a closure member disposed between the mouth of the conduit and the carriage and comprising a plurality of metal flights having hinge portions formed thereon, said flights being connected by means of said hinge portions to form an articulated closure member, a retaining member mounted at one side of the mouth of the conduit, means securing one end of the closure member to the retaining member, and flexible means passing beneath the carriage and connecting the other end of the closure member to the retaining member, said flexible means being of such length and so arranged that when the closure member is in an opened position, a forward portion thereof hangs downwardly substantially freely over the forward end of the carriage.

MONROE R. HULL.